United States Patent [19]

Lunau

[11] 4,336,896
[45] Jun. 29, 1982

[54] ELECTRICALLY CONTROLLED IN-LINE DISPENSING FAUCET

[76] Inventor: John A. Lunau, Pfaffenberger Weg. 270 Bruhler Str. 49-51, D-5650 Solingen, Fed. Rep. of Germany

[21] Appl. No.: 108,372

[22] Filed: Dec. 31, 1979

[51] Int. Cl.³ .......................... B67D 3/00; F16K 31/02
[52] U.S. Cl. .................................. 222/504; 251/137; 251/141
[58] Field of Search ................ 222/504; 251/137, 139, 251/141, 340; 137/614.16, 614.17

[56] References Cited

U.S. PATENT DOCUMENTS

| 3,178,151 | 4/1965 | Caldwell | 251/139 X |
| 3,470,892 | 10/1969 | Barker | 251/139 X |
| 3,484,076 | 12/1969 | Naumann | 251/141 |
| 3,589,391 | 6/1971 | Pagliaro | 251/139 X |
| 3,592,438 | 7/1971 | Greenwood et al. | 251/139 X |
| 3,670,768 | 6/1972 | Griswold | 251/141 X |
| 3,687,216 | 8/1972 | Tracy | 251/139 X |
| 3,762,683 | 10/1973 | Sangl | 251/139 |
| 3,833,015 | 9/1974 | Kneuer | 251/139 X |

Primary Examiner—Robert J. Spar
Assistant Examiner—Edward M. Wacyra
Attorney, Agent, or Firm—Herzig & Walsh Inc.

[57] ABSTRACT

An in-line electrically operated dispensing faucet for fluids such as beer and other liquids. A reciprocatable plunger operates in a tubular member relative to a seat. An electromagnetic device is provided for reciprocating the plunger. The plunger has channels to provide for in-line flow through it and through the tubular member between the inlet and outlet. In a second form of the invention, a second in-line plunger is provided in the tubular member and a second electromagnetic device constructed to be powered by way of pulsating DC voltage so as to reciprocate the second plunger is provided. The second plunger is also of in-line construction so that the flow is in line with the axis of the plunger and with the tubular member. The second plunger is restrained by a spring and is able to engage the first plunger so as to intermittently interupt flow through the first plunger for purposes of creating foam within the tubular O-ring.

5 Claims, 8 Drawing Figures

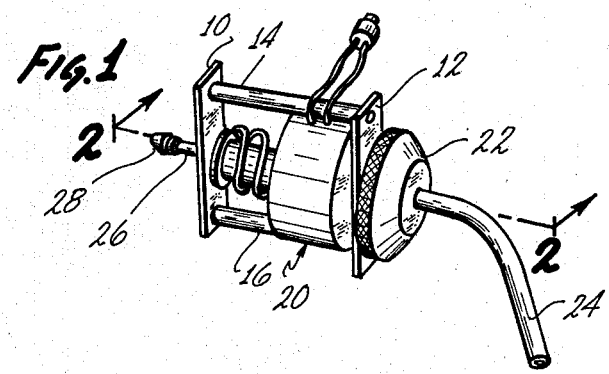
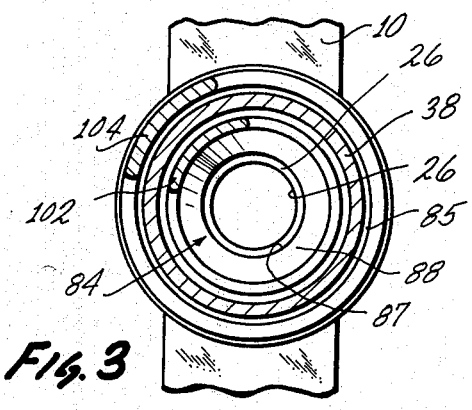
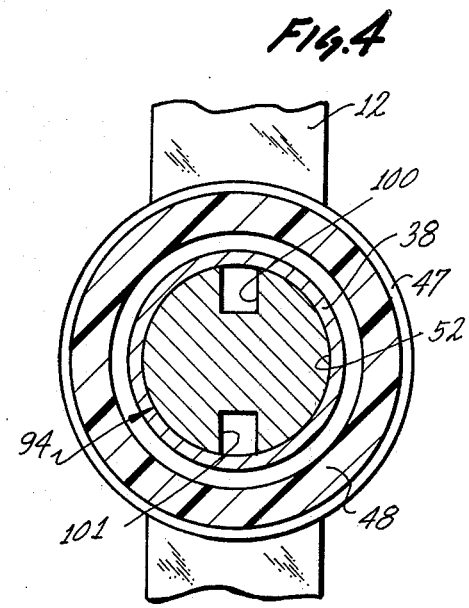
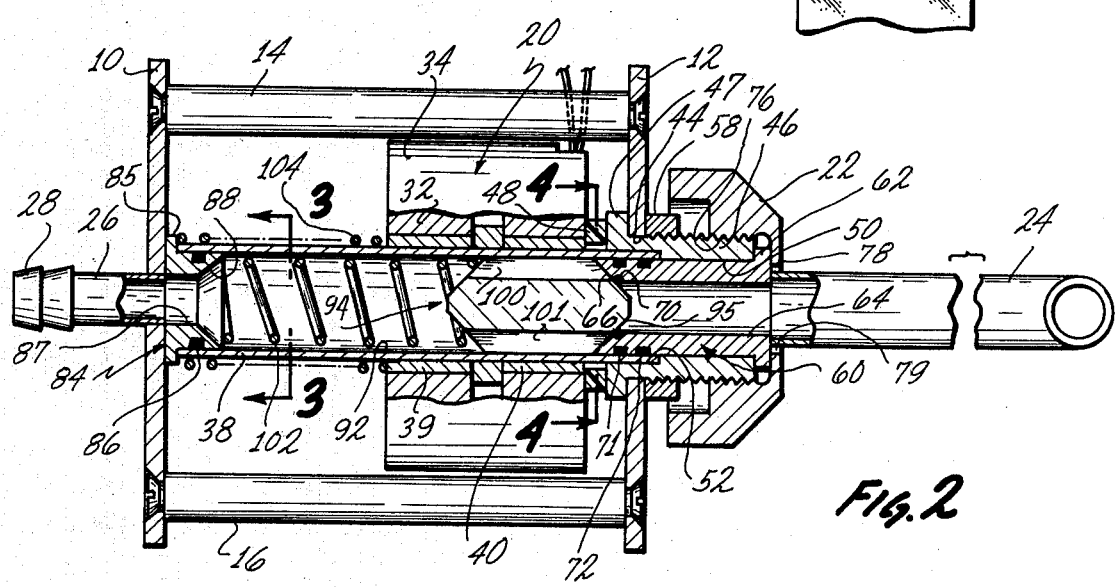

ELECTRICALLY CONTROLLED IN-LINE DISPENSING FAUCET

BACKGROUND OF THE INVENTION

1. Field of the Invention

The field of the invention is that of dispensing faucets for fluids more especially liquids. The field of the invention is more particularly that of electrically operated dispensing faucets.

2. Description of the Prior Art

With respect to dispensing faucets to the extent that electrically operated faucets are known, their capabilities are very limited. It is believed that known faucets do not posess desired capabilities in the beverage field but also in the field of other liquids including semi-liquids or even viscous flowing materials such as catsup or mustard.

As far as known with respect to the dispensing of beer, there have not existed electrically operated faucets having the capability of handling this beverage.

Further with respect to prior art the capability of dispensing faucets of creating or building up foam as desired and that of extracting $CO_2$ from the solution has not existed so that it was not possible to produce a foam collar on the the dispensed beer to our knowledge.

In connection with the portioning of beer, due to the foam it has not been possible to pour the beer completely without foam to a proper set level, there has been no capability of pouring the beer without foam and then setting the foam on top to a desired level.

Largely in the past only manually operated faucets have been used where portioning has not automatically been possible with its various advantages.

SUMMARY OF THE INVENTION

As identified in the foregoing, the invention is an electrically operated faucet highly adapted for use with beer but also usable with other fluids.

It is common and typical in the prior art to use portioning control with soft drinks but such control has not been available in the prior art for use with beer.

The herein invention provides an electrically controlled beer dispensing faucet in various forms.

In one form, which is a preferred form, a single solenoid controlled plunger is used constructed to be able to dispense the beer either with or without producing a controlled foam collar on the beer. In another form of the invention dual electrical solenoids and plungers are employed, one of which is constructed to operate as a vibrator to produce the foam as described more in detail hereinafter.

The faucet of the invention while highly adapted for use with beer can be used with any liquid, semi-liquid or even a viscous fluid, like catsup or mustard. Preferred sizes are such as to adapt the nozzle to its various utilizations.

In connection with the portioning of beer, this has been a major problem due to the foam. The herein invention makes it possible to dispense and pour the beer completely without foam to the proper set portion and then after that the foam can be set on top of the dispensed beer aside from the portioning control at will. The in-line plunger effect of the invention provides for instantaneous opening and closing of the system and the nozzle can be used for filling any type of container.

Preferably the electrified faucet is adapted for use with 24 volt D.C. current. The speed of flow can be graduated from a lower to a higher speed with a single plunger by varying the number of channels through the plungers.

In the one plunger form of the faucet, the operation is simple, being controlled by a single button for operation of the magnetic coil. The two plunger system is described hereinafter. In the one plunger system when the button is pressed, the plunger is drawn back allowing flow through the channel or channels in the plungers and out the pouring spout. Normally the top of the plunger rests against an O-ring seal, the cone of the plunger sealing against the O-ring so that the higher the pressure behind the plunger the better it seals.

For semi-liquids or viscous fluids, only the one plunger system is utilized. The two plunger system could be used by changing the coils so that there is no vibrating action but rather there is a higher traction by use of the two coils on the faucet and operating them in parallel, as described hereinafter.

In a second form of the invention, two in-line magnetically actuated plungers are utilized, one of them adding a vibrator action being powered by pulsating DC current. The vibrating effect that is set up causes a foam build-up or $CO_2$ can be extracted out of the solution and with beer, a so called "beer collar" can be artificially produced on the dispensed beer. This action is analagous to the so called "freshing up or topping off" in relation to soft drink dispensing.

Typically in the two plunger system there is a central bore running through the plunger which allows the foam-beer to run through it into the pouring spout where a further expansion takes place due to difference in bore size and foam is the result referred to as "milk" in the trade.

In the form where two magnetic coils are present they can be operated in various wiring combinations, that is individually, in series or in parallel whereby working pressures of up to sixty pounds per square inch can be realized so that the traction power of the coils will operate effectively against the head pressure or propellant pressure. The vibrator plunger can be operated singly if desired. Typically operating pressures in the United States are in the range of 15-20 pounds per square inch.

In the two plunger system there are two control buttons. The second button when placed into operation causes the vibrator plunger which is responsive to pulsating current voltage to be moved forward on to the first plunger and as a result moves backward against the spring. Because of the smaller coil (½ magnetic field) the power is insufficient to hold the plunger stationary allowing it go forward producing the vibration effect. This breaks down the $CO_2$ in solution of the beer, producing foam. The vibration frequency corresponds to the cycles of the pulsating D.C. current such as 50 cycles (in Europe) or 60 cycles in the U.S.A. The foam is then allowed to pass through the central bore of the first plunger.

In the two plunger system the number two plunger, that is the vibrating plunger, has a rubber nose so that this rubber nose sits on the opening in the bore in plunger number 1, thereby sealing off any liquid outlet through the bore in this plunger. Thus in this case, liquid flows through the channels or holes in plunger number two and then through the channel or channels in plunger number 1 and out the pouring spout. During the vibrating action the pressure in the system keeps plunger number one closed up against the O-ring seal, closing the outlet.

In a preferred construction a space is provided between the magnetic coils and the enclosing sleeve so as to allow the coils to "breathe". The purpose here is that when the beer is very cold, sweating on the outer plunger housing will not allow the magnetic coils to lie in a moist area or atmosphere.

Preferably all the components are of stainless steel.

In the light of the foregoing, a primary object of the invention is to make available an electrically operated in-line dispensing faucet for use in the dispensing and proportioning of fluids including not only beverages but also including semi-liquids and viscous flowing materials.

A further object is to realize a faucet as in the foregoing of an in-line construction embodying a tubular means having reciprocatable valve plunger means within the tubular means constructed for an in-line flow relationship.

A further object is to realize equipment as in the foregoing which is electrically operated by way of electromagnetic means positioned around the tubular means and responsive to manual push button control.

A further object is to make possible the realization of portioning dispensing of beer either without a head, that is, without a foam collar, or placing a foam collar of a desired height after dispensing of beer to a predetermined level.

A further object is to realize accurate control of the starting and stopping of flow of beer without after flow.

A further object is to realize the purpose of controlling the production of foam by way of a second reciprocatable in-line plunger co-operating with a first plunger means, the second plunger means being energized by pulsating D.C. current voltage whereby foam is produced and controlled in its delivery to the dispensed beer.

Further objects and additional advantages will become apparent from the following detailed description and annexed drawings.

BRIEF DESCRIPTION OF THE DRAWINGS

FIG. 1 is an isometric view partly schematic illustrating a typical preferred construction of the faucet of the invention;

FIG. 2 is a sectional view taken along the line 2—2 of FIG. 1 illustrating a preferred form of the invention using a single plunger;

FIG. 3 is a sectional view taken along the line 3—3 of FIG. 2;

FIG. 4 is a sectional view taken along the line 4—4 of FIG. 2;

DESCRIPTION OF A PREFERRED EMBODIMENT AND BEST MODE OF PRACTICE

Figure 5:
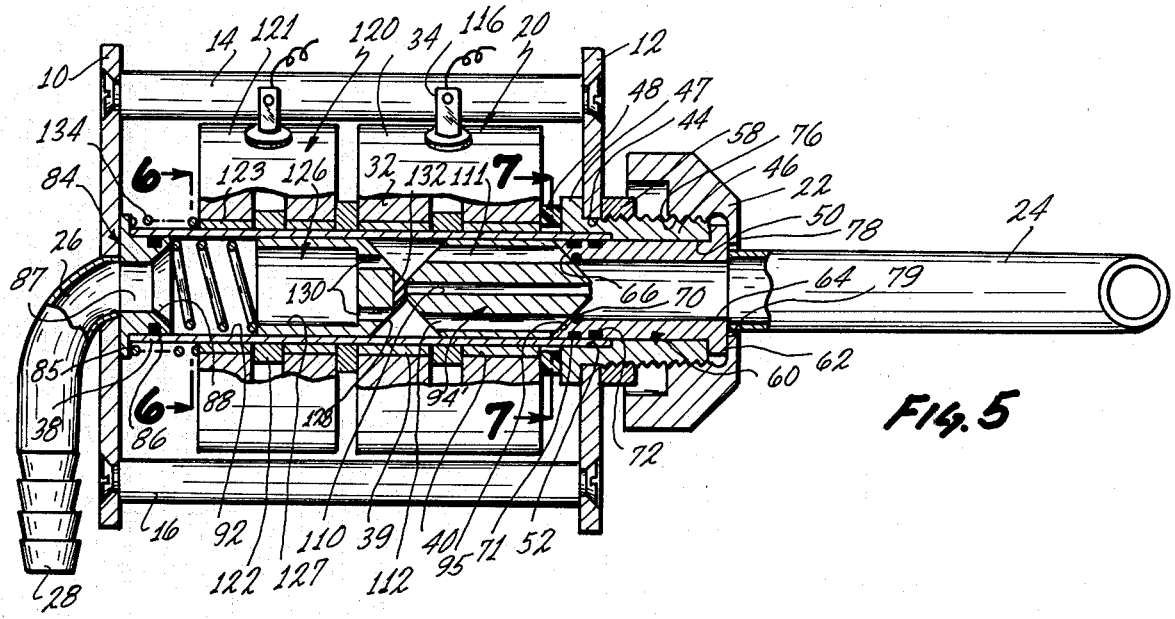
FIG. 5 is a sectional view of the second form of the invention in which a second vibrator plunger is used.

FIGS. 1-4 of the drawings show a preferred form of the invention utilizing a single plunger. FIG. 1 illustrates the appearance of the assembled device. Numerals 10 and 12 designate a pair of frame members having posts 14 and 16 extending between them. Supported in between the posts is electromagnet 20 which includes a core and a winding as will be described presently. Adjacent to the member 12 is a fitting 22 from which extends the discharge pipe 24. The inlet pipe for the beer or other fluid is designated at 26 having a fitting 28 on its end.

The cross-sectional views 2-4 illustrate the construction more in detail. The member or posts 14 and 16 which space the end members 12 preferably are attached by countersunk screws as shown. The electromagnet 20 includes a ring shaped center core of electromagnetic material as designated at 32 and a winding 34 which may be a single winding or it may be formed in two parts. The winding 34 is ring shaped as usual having a bore.

Numeral 38 designates a tubular member made of suitable material which passes through the bore in the electromagnet and the winding 34. Numerals 39 and 40 designate bushings positioned between the exterior of the tube 38 and the interior of the bore in the winding 34.

The end plate 12 has a bore or hole in it as designated at 44 and extending through it is a bushing or gland member 46 which is threaded and which has a flange 47 at its inner end which is adjacent to the member 12 and in between the winding 34 and the flange 47 is a spacer member 48. The gland member 46 has a bore 50 and a counterbore 52. The spacer 48 is around the outside of the bushing 40. The end of the tubular member 38 extends into the counterbore 52.

Numeral 58 designates a ring nut or gland nut which is threaded onto the member 46 and against the end member 12.

Numeral 60 designates a cylindrical valve fitting which fits in the bore 50 of member 46. It has an end flange 62 that engages the end of member 46. Its inner end fits inside of the tubular member 38. The member 60 has a central bore 64 and the end of the member is formed on a slant at an oblique angle as designated at 66. At the end of the bore 64 in the member 60 there is an annular groove which receives O-ring 70 for purposes of sealing against a valve plunger as will be described. On the outside of the member 60 it has a pair of annular grooves which receives O-rings 71 and 72 which seal against the interior of tubular member 38.

Fitting 22 is in the form of a nut having a cross-sectional shape as shown. It has an internal threaded bore 76 which threads onto the member 46 as shown. It has an end flange 78 which fits against the flange 62 this part having a bore 79 and fitting into this bore and against the end of the member 60 is the output pipe 24.

At the opposite end of the tubular member 38 is a fitting 84 having a flange 85 that seats against the end plate 10. It has an external diameter to fit into the end of the tubular member 38. In the outside of member 84 is a groove having an O-ring 86 for sealing. The member 84 has a bore 87 and a slanted counterbore 88. The member 10 has a bore or hole aligned with the bore 87 and fitted into this bore is the end of pipe 26 as shown.

The tubular member 38 has bore 92 and movable in this bore within the electromagnet 30 is a valve plunger 94. At the right end of the valve plunger 94 is a conical nose as shown at 95 so that its surface can seat against the slanted or conical end 66 of the member 60 and against the O-ring 70.

The member 94 has two axial peripheral channels in it as designated at 100 and 101. See FIG. 4. These channels normally allow flow through this plunger when it is unseated from its seat.

Positioned between the left end of plunger 94 and the member 84 is a coil spring 102 which normally urges the plunger against its seat. On the outside of the tubular member 38 is another coil spring 104 positioned between the flange 85 on member 84 and the electromagnet 20, this spring normally urging the electromagnet against the spacer 48.

The operation of this form of the invention will be described hereinafter at the same time as the operation of the second form of the invention is described since the two forms of the invention have some operating characteristics in common.

The O-rings are all food grade approved, buna "n" or silicon rubber or Viton.

In the first form of the invention the single plunger type of faucet can be modified such that it has capability over a wide range of uses, not being just limited to beer but having the capability of producing the beer collar as described in the foregoing. This modified form simulates the effect described with the single plunger.

In this form or modification of the invention a four channel plunger may be used. The beer may be at a temperature of perhaps 36° F. or 2° C. Through the fast dispensing set up at 18 pounds per square inch or even at 15 pounds per square inch the four jets of beer passing along the channels of the plunger are diverted into each other in the pouring spout causing turbulence and thereby setting the $CO_2$ free and producing the foam for a collar on the beer as is typically desired in the United States where beer is drunk with only somewhat of a collar on it.

The action can further be increased by drilling a small hole in the top of the pouring spout 24 to obtain a "schnorkel" effect whereby the velocity of the beer going down the spout causes air to be sucked into the spout and causing more turbulence and foam. This breathing hole has a still further effect when portioning the beer in that when the in-line solenoid closes there is the elimination of the "after run" of beer in the spout until the pressures have equalized themselves; the equalization is immediate also. The form of the invention with the single plunger is of course cheaper and easier to produce and can be offered as an option with tubulating effect. The form with two windings and plungers are offered as another option, as described hereinafter.

Figure 6:
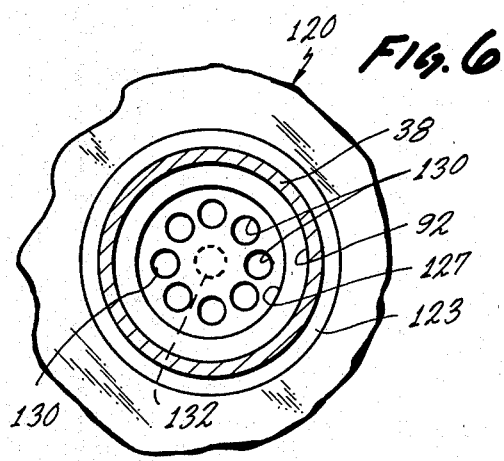
FIG. 6 is a sectional view taken along the line 6—6 of FIG. 5.
Figure 7:
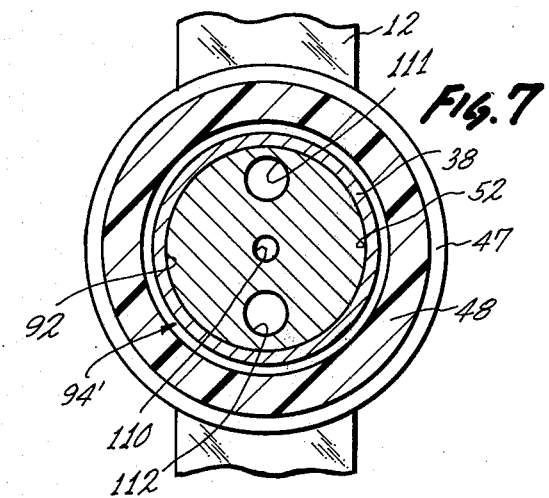
FIG. 7 is a sectional view taken along the line 7—7 of FIG. 5.

FIGS. 5-7 are cross-sectional views showing a second form of the invention. To the extent that this form of the invention has parts which are like and correspond to that of the previous embodiment they are identified by the same reference characters. Elements or components that are modified are identified by a similar reference character primed.

It will be seen that FIGS. 5, 6 and 7 have similarity to the previous embodiment with the principle difference that there are two electromagnets and two plungers. The valve plunger 94' within the bore of the tubular member 38 has a central bore 110 and also two axial bores 111 and 112 which are diametrically spaced from each other. As explained in the foregoing, different numbers of axial bores may be utilized. See FIG. 7.

The electromagnet 20 is like that of the previous embodiment and is similarly positioned relative to the end parts and the plunger 94'. Numeral 116 designates an electrical terminal for the electromagnet 20.

Numeral 120 designates a second electromagnet with an alternating current winding 121 and ring shaped core 122. Between the center opening of the winding 121 and the tubular member 38 is a bushing 123. Within the bore 92 of the tubular member 38 is a second plunger as designated by the numeral 126. The plunger 126 has a relatively large cylindrical bore 127. It has a conical end as designated at 128 forming a nose and formed in the end part are a plurality of axial bores or passage ways one of which is designated at 130 in FIG. 6. The number of these bores or passage ways can be varied. The end or nose of the plunger member 126 is flat rubber tip designated at 132, the end is constructed to fit against the end of the plunger 94' in order to close the bore 110 in this plunger. Positioned between the second plunger 126 and the end fitting 84 is a coil spring 134, the purpose of which will be described presently.

Figure 8:
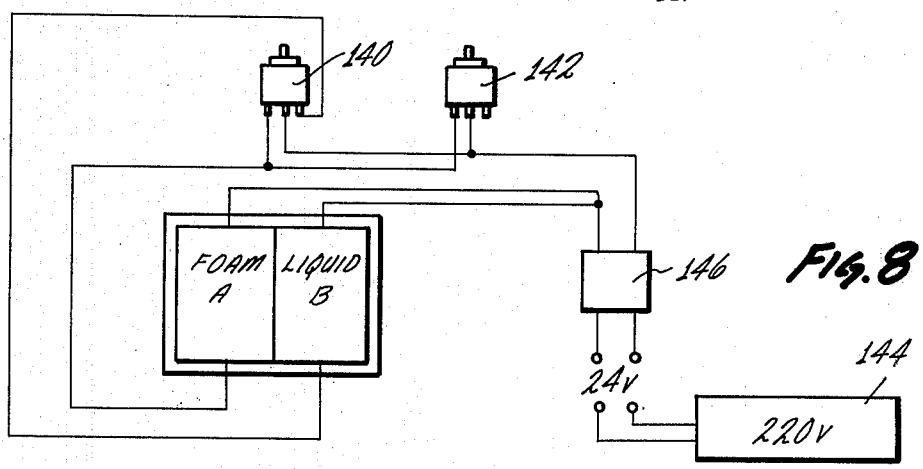
FIG. 8 is a schematic view of a preferred wiring diagram.

With the first form or embodiment of the invention only a single control button or switch is needed for operating this single electrical solenoids. Two control switches or buttons are used in the second form of the invention. The two electromagnets are identified by the letters A and B on FIG. 8. Numerals 140 and 142 designate manual push button switches having three terminals including a common terminal, a normally open contact and a normally closed contact. Numeral 144 designates a 220 volt source which can be connected to a transformer to provide 24 volts as normally used for operation of the system. Numeral 146 designates an A.C.-D.C. bridge for purposes of supplying pulsating D.C. current for the electromagnet 120. As may be seen, the button switch 140 controls the electromagnet 20 and the button switch 142 controls the electromagnet 120.

In the preferred construction a space is provided between the magnetic coils 20 and 120 and the outer enclosing sleeve which normally is provided so as to allow the coils to "breathe". The purpose of this arrangement is that when the beer is very cold, sweating on the outter plunger housing will not allow the magnetic coils to lie in a moist area or atmosphere. Preferably all the components are of stainless steel.

Variations can be made in the utilization of the second form of the invention. The two magnetic coils can be operated in different wiring combinations, that is, individually in series or in parallel working pressures of up to 60 pounds per square inch can be realized, the attraction power of the coils operating effectively against head pressure of propellant pressures. The vibrator plunger can be operated individually if desired. Typically operating pressures in the United States are in the range of 15-20 pounds per square inch.

OPERATING OF THE PREFERRED EMBODIMENTS AND BEST MODE OF PRACTICE

The general utilization of the invention has been described in the foregoing, especially within connection with its use for beer. In the portioning control of beer the invention makes it possible to pour the beer completely without foam, and after that the foam can be set to the desired height of collar. The in-line plungers makes possible instantaneous opening and closing of the system. The speed of flow can be graduated by varying the number of channels through the plunger or plungers.

Referring to the first form of the invention when the push button 140 is pressed the single plunger is drawn back allowing flow through the channel or channels in the plunger 94 and then out the discharge or pouring spout 24. Normally the tip of the plunger is sealed against the O-Ring 70.

Referring to the operation of the second form of the invention shown in FIGS. 5–7, for operation both of the push buttons 140 and 142 are actuated. The second plunger 126 being powered by pulsating D.C. current voltage applies a vibrating action or effect. It moves back against the spring the force of which is substantially equal to the magnetic force to set up the vibrating action. The vibrating effect causes a foam build up, or $CO_2$ can be extracted out of the solution and with beer in this manner a so called "beer collar" can be artifically produced on the dispensed beer. A rubber nose is provided on the second plunger 126, so that this rubber nose will seat on the opening at the end of the central bore in plunger 94'. In this arrangement the liquid flows through the channels or bores 130 in plunger 126 and then through the channels or bores in plunger 94' and then out the pouring spout. During the vibrating action the pressure in the system keeps plunger 94' closed up against the O-ring in the member 60.

From the foregoing, those skilled in the art will readily understand the nature and construction of the invention and the manner in which it achieves and realizes all of the objectives as set forth in the foregoing.

The foregoing disclosure is representative of preferred forms of the invention and is to be interpreted in an illustrative rather than a limiting sense, the invention to be accorded the full scope of the claims appended hereto.

What is claimed is:

1. In an electrically operated in-line dispensing faucet, in combination, tubular means having an inlet flow tube and an outlet flow tube, means forming a valve seat in the tubular means, valve means in the form of a plunger which is reciprocatable in the tubular means, the said valve means being configured to seat on the seat and having channel means formed in it for flow of fluid through it and electromagnetic means positioned around the tubular means for producing reciprocating movement of the said plunger means, second plunger means within said tubular means in-line with said first mentioned plunger, second electromagnetic means positioned around said tubular means and a source of pulsating D.C. voltage for said second electromagnetic means, said second electromagnetic means being connected to produce reciprocation of said second plunger means, said first and second plunger means being configurated whereby the second plunger means is operable to intermittently engage the first plunger means and prevent flow of fluid therethrough.

2. Apparatus as in claim 1 wherein the said first plunger means has a central bore therethrough, and said second plunger means having a part positioned to engage the end of said bore to prevent the flow of fluid therethrough.

3. Apparatus as in claim 1 wherein said first plunger means is provided with axial channel means spaced from the axis of said second plunger means for providing for flow through it.

4. Apparatus as in claim 1 including spring means interposed between said inlet end of said tubular means and said second plunger means whereby said second electromagnetic means is able to cause said second plunger means to reciprocate within said tubular means and to intermittently close off flow through the first plunger means.

5. Apparatus as in claim 1 including electrical circuitry and power means for actuating said first and second electromagnetic means, and manual switches for individually controlling said first and second electromagnetic means.

* * * * *